Patented May 11, 1943

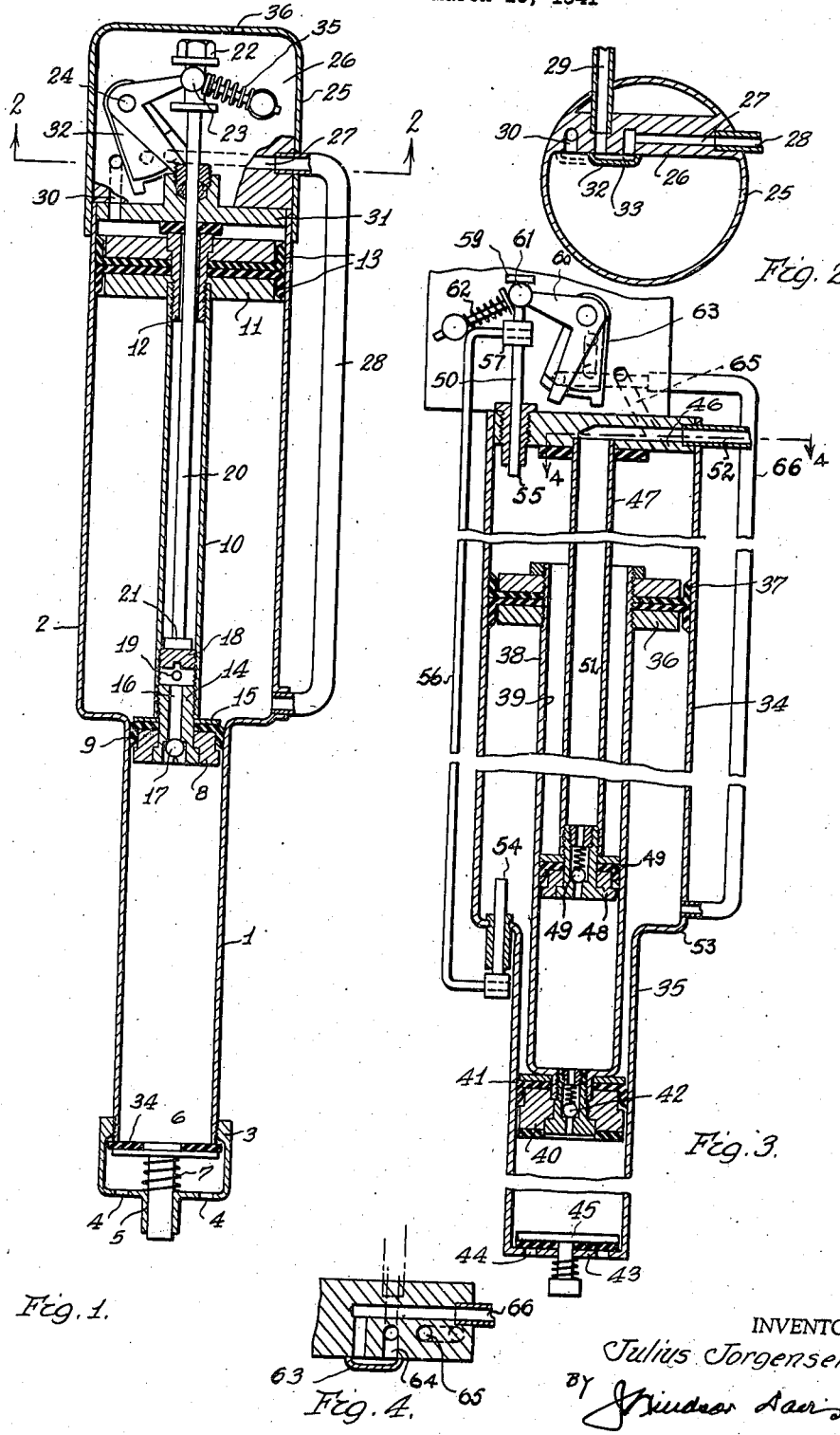

2,318,782

UNITED STATES PATENT OFFICE 2,318,782

PRESSURE PUMP

Julius Jorgensen, Detroit, Mich.

Application March 15, 1941, Serial No. 383,487

1 Claim. (Cl. 230—52)

This invention relates to pumps and particularly to a reciprocating pump in which a source of negative pressure supply is employed as the motivating means for furnishing a source of positive pressure supply.

The trend in modern automobiles is to add additional automatic equipment. Vacuum pumps are used in some instances but certain accessories demand such power that a suitable vacuum pump would be ungainly in size. Among the proposed new accessories, for instance, are power actuated windows. An object of this invention is to provide a positive pressure pump actuated by a vacuum motor subject to a variable source of vacuum as is found on an automobile, and which will be self regulating to maintain a given pressure in a storage tank or accumulator.

A further object is to provide a pressure pump comprising a cylinder and piston so constructed and arranged as to reduce to zero the piston clearance with respect to the cylinder head.

Another object is to provide an improved valve actuating means for causing the piston to reciprocate under constant pressure, said means including a lost motion linkage by which the size of the pump is reduced to a minimum.

A further object is to provide a double acting pump having the above recited advantages and which can be built to maximum power for a given size, the double action serving to provide multi-stage compression.

Other objects and advantages will become more fully apparent as reference is had to the accompanying drawing in which the invention is illustrated and in which Fig. 1 is a longitudinal diametric section through the entire pump, Fig. 2 is a transverse section taken along the line 2—2 of Fig. 1, Fig. 3 is a longitudinal diametric section through a modification of the pump of Figs. 1 and 2, and Fig. 4 is a fragmentary section taken along line 4—4 of Fig. 3.

More particularly 1 and 2 refer to a small or compression cylinder and a large or vacuum cylinder, respectively. The cylinder 1 has a cylinder head 3 which has delivery parts 4 therethrough and an opening 5 which serves as a guide for the delivery valve 6. The valve 6 overlies the end of the cylinder 1 so that the end of the cylinder serves as a seat for it. A spring 7 urges the valve toward its seat.

Within the cylinder 1 is a piston 8 having a packing 9 therearound suitable for pumpig air.

The piston is connected by a piston rod 10 to a piston 11 by means of a threaded shouldered bushing 12 so that when the piston rod is screwed down onto the bushing it clamps the packings 13 firmly in place.

The piston 8 is connected to the piston rod 9 also by a shouldered bushing 14 which has outside threads so that when the piston rod is tightened thereagainst the shoulder of the bushing is pressed tightly against the piston. A plate 15 presses against the packing 9 to retain it in shape. The interior of the bushing, being hollow at 16, is shouldered to provide a seat for the check valve 17. The other end of the bushing is closed at 18, forming a partition inside the connecting rod 10, which is otherwise hollow. Between the partition 18 and the check valve 17 one or more ports 19 connect the passage 16 with the interior of the cylinder 2.

On the side of the partition 18 away from the check valve 17 is a valve rod 20 which extends the length of and outwardly of the piston rod 10. This rod 20 has an enlarged end 21 which abuts the partition 18 alternately with abutment of the bushing 12 thereby constituting a lost motion linkage for operation of valve mechanism as will now be described.

The valve rod 20 terminates at its outer end in an enlarged head 22 and has a flange therearound inwardly of the head 22 thus forming a sort of yoke in which the ball end 23 of a bell crank is found. The bell crank is pivotally mounted at 24 in a valve housing 25 on the end of the cylinder 2. The housing 25 has a transverse partition 26 which has several passages formed therein. One of the passages 27 leads into a tube 28 which, in turn, leads into the cylinder 2 near the opposite end thereof; another of which 29 is connected into a source of negative pressure supply (not shown); and the third one of which 30 leads through the cylinder head 31 into the cylinder 2 on the side of the piston 11 opposite to the outlet from the tube 28. A shuttle slide valve 32 is pivotally mounted with the bell crank at 24 for actuation thereby. This valve has a chamber 33 which is constantly open to the source of vacuum 29 and which is movable to connect the line 29 either with one side of the piston 11 through the line 30 or with the other side of the piston 11 and the passage 16 through the line 27.

The operation is as follows: if operation starts from the position illustrated in Fig. 1 by connecting the line 29 with a source of negative pressure supply the valve 32 being in position to connect the lines 29 and 27 will permit exhaustion of air from the cylinder 2 by way of the tube 28 thus causing the piston 11 to traverse the length of the cylinder 2. Movement of the piston 11 causes axial movement of the piston 8 in a direction to expel air from the cylinder 1 past the valve 6. The stroke of the piston 8 is such that it may actually contact the valve 6 so that the valve 6 is equipped with a rubber-like pad 34 to deaden noise which would otherwise result. As the pistons move forward the valve rod 20 does not move until its head 21 is contacted by the bushing 12. It is then moved with the pistons in their final movement which initiates movement of the bell crank end 23 until the bell crank which is spring pressed by the spring 35 snaps it to reverse position. The snap action causes the shuttle valve 32 to shift to its other position in order to cause inter-connection of the passages 29 and 30.

During the movement just described the negative pressure on the one side and positive pressure on the opposite side of the ball check valve 17 collaborate to hold this valve tightly seated. As soon as the passage 27, 28 is removed from the influence of the suction line 29 they are open to atmospheric pressure through the ports 36 so that upon return movement of the pistons a fresh charge of air finds its way into the cylinder 1 through the passage 16. The return movement is brought about by continuation of negative pressure through the lines 29, 33, 30 acting to exhaust the air in the cylinder 2 which is now between the piston 11 and the cylinder head 31.

It will thus be seen that the vacuum pump will tend to operate at all times during which it is subject to a source of vacuum supply but that it will be working against a pressure which will cause it to cease operation as soon as the pressure becomes a maximum. Any drop in the pressure will permit resumption of operation by the vacuum operated piston so that the device is entirely self regulating to maintain the maximum pressure for which it is designed.

Fig. 3 illustrates a modification in which the compression of the air is multiple stage. A large cylinder 34 is in tandem coaxially with a cylinder 35 of smaller diameter. Inside the cylinder 34 is a piston 36 having a packing 37 and rigidly secured to a piston rod 38 hollow internally to form a cylinder 39. The opposite end of the piston rod 38 is rigidly secured to a piston 40 having a packing 41 guarding the periphery thereof. Installed in this piston is a spring pressed check valve 42 guarding a passageway through the piston which connects the interior of the cylinder 35 with the interior of the cylinder 39.

The cylinder 35 is closed at its outer end by a cylinder head 43 having ports 44 therethrough guarded by a spring pressed inwardly opening check valve 45 so that as the piston 40 retracts air is drawn therepast.

That end of the cylinder 34 opposite the cylinder 35 is closed by a cylinder head 46 having a fixed hollow piston rod 47 anchored therein. A piston 48 secured to the outer end of the rod 47 has a packing 49 between it and the cylinder 39, and a spring pressed check valve 50 guards a passageway connecting the interior of the cylinder 39 with the hollow interior 51 of the rod 47. The interior of the rod 47 empties into a passageway 52 to a means (not shown) of using or storing air under pressure.

Extending through the cylinder head 46 and through the reduced or shouldered end portion 53 of the cylinder 34 are valve actuating rods 54 and 55, connected by the bent pushrod 56. The end of the rod 55 outwardly of its end 57 has an extension 58 which terminates in a flange 59 by which a shuttle valve mechanism similar to that previously described in connection with Fig. 1 is operated. This valve mechanism consists also of a bell crank 60 having a ball end 61 for alternate actuation by the flange 59 and the rod end 57, a pivoted spring 62 pressing thereagainst to provide snap action. The other end of the bell crank has lost motion engagement with a shuttle valve 63 which continuously overlies the inlet of a vacuum line 64 and alternately connects this line with the line 65 leading into the cylinder 34 between the head 46 and the piston 36 or with the line 66 leading into the cylinder 34 at the opposite side of the piston 36.

The operation is as follows: With the shuttle valve in the position illustrated negative pressure in the line 66 causes the pistons 36 and 40 to move in the direction of the bottom of the page. The piston 40 forces the valve 45 tightly closed by the tendency to build up pressure on the air in the cylinder 35 and forces the air past the check valve 42 into the outer end of the cylinder 39. The end of the piston 40 and the liner of the valve 45 are both preferably made of resilient material which will permit actual pressure contact thereof in order to force out all air therebetween.

Upon contact of the piston 36 with the valve rod 54 the shuttle valve 63 is thrown to its alternate position thus connecting the source of negative pressure supply to the opposite side of the piston 36. As the piston 36 retracts it also retracts the piston 40 which simultaneously draws air into the outer end of the cylinder 35 past the valve 45 and forces the air in the outer end of the cylinder 39 past the valve 49 into the line 51, 52.

What is claimed is:

A pump comprising two cylinders of unequal diameter having pistons therein connected by a piston rod for joint movement, the larger of said pistons being subject to a source of negative pressure for actuation thereof, the smaller of said cylinders having a valve overlying the outer end thereof and a cylinder head housing said valve, said piston rod being hollow and having a partition near one end thereof, said piston rod having an opening through the walls thereof between said partition and the smaller of said pistons forming a passage connecting said cylinders, a check valve guarding said passage carried by said smaller piston, a lost motion shaft inside said hollow piston rod on the side of said partition opposite said smaller piston, and a shuttle valve operable by said lost motion device as said pistons approach each end of their strokes, said shuttle valve alternately connecting one side of said larger piston or the other side of said larger piston and the passage leading to the valve carried by said smaller piston with the atmosphere or with said source of negative pressure supply.

JULIUS JORGENSEN.